Nov. 15, 1927.

L. B. HUNTER 1,649,308

APPARATUS FOR MAKING AND FILLING CHOCOLATE TUBES

Filed Dec. 5, 1923   3 Sheets-Sheet 1

INVENTOR.
Lewis B. Hunter
BY James L. Stewart
his ATTORNEYS.

Nov. 15, 1927.                                            1,649,308
L. B. HUNTER
APPARATUS FOR MAKING AND FILLING CHOCOLATE TUBES
Filed Dec. 5, 1923          3 Sheets-Sheet 2
Fig. 2
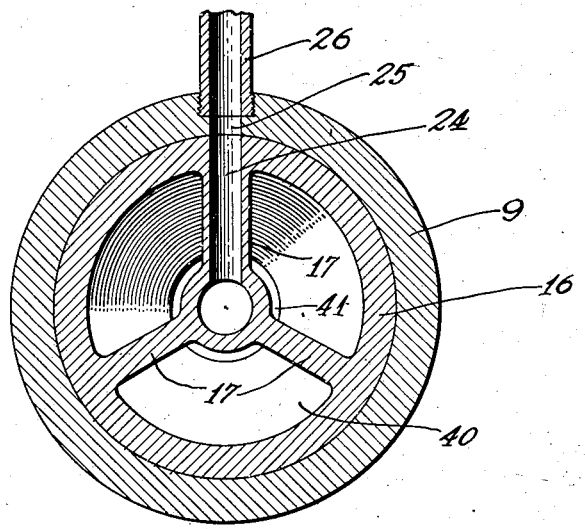
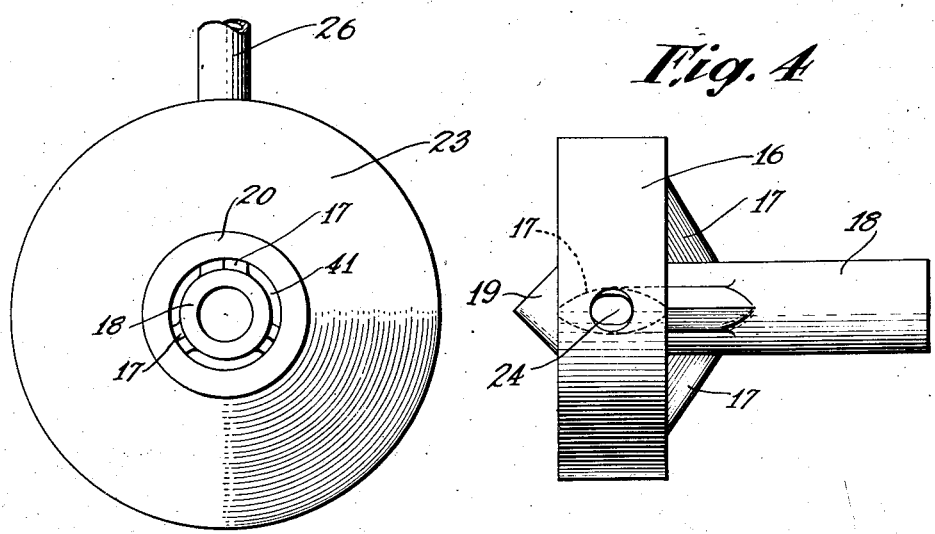
Fig. 3
Fig. 4
INVENTOR.
Lewis B. Hunter
BY James L. Stewart
his ATTORNEYS.

Nov. 15, 1927.
L. B. HUNTER
1,649,308
APPARATUS FOR MAKING AND FILLING CHOCOLATE TUBES
Filed Dec. 5, 1923       3 Sheets-Sheet 3
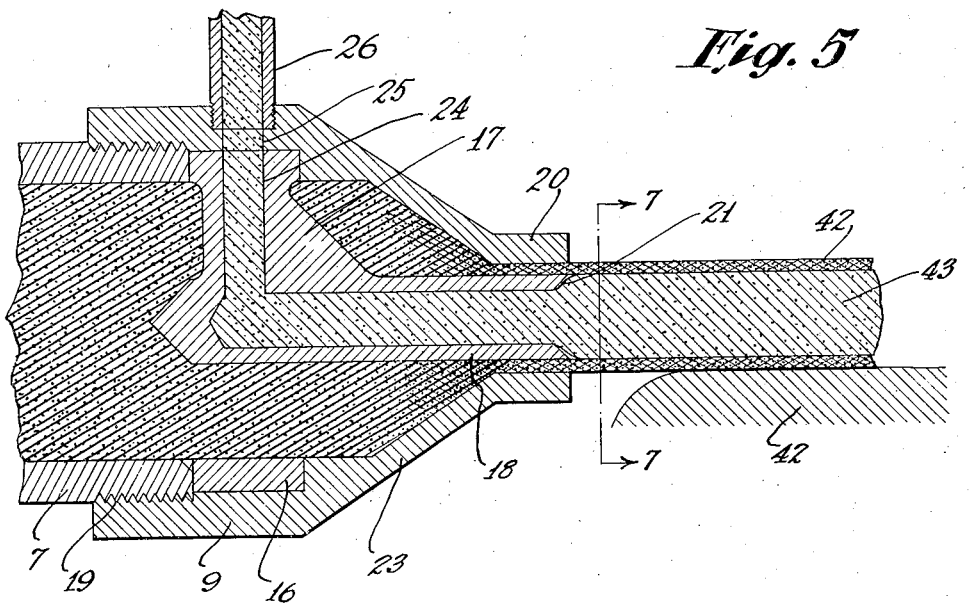
Fig. 5
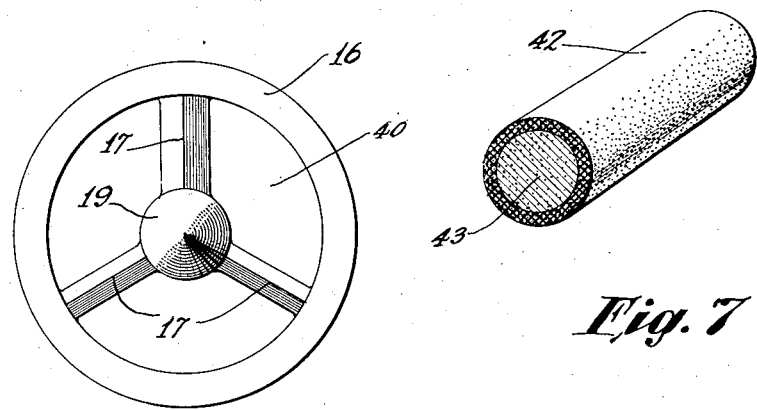
Fig. 6
Fig. 7
INVENTOR.
Lewis B. Hunter
BY James L. Stewart
 *his* ATTORNEYS.

Patented Nov. 15, 1927.

1,649,308

UNITED STATES PATENT OFFICE.

LEWIS B. HUNTER, OF YONKERS, NEW YORK, ASSIGNOR TO REMSEN T. WILLIAMS, OF KENSINGTON, NEW YORK.

APPARATUS FOR MAKING AND FILLING CHOCOLATE TUBES.

Application filed December 5, 1923. Serial No. 678,723.

This invention relates to the confectionery art, and particularly has reference to apparatus for making chocolate forms and various confectionery compounds, and the apparatus herein disclosed is an improvement on my structure made the subject of my application Serial Number 651,908, filed July 16, 1923.

As disclosed in my aforesaid application, I have discovered that chocolate and compounds thereof can be shaped, molded and formed by pressure into hollow cylinders and various other forms and shapes, while the same is cold or at a temperature below the melting point of the substance; and in my said application I have disclosed a method and an apparatus by which these desirable results can be produced.

My present invention, in addition to the formation of a chocolate tube, contemplates means by which said tube may be filled with a suitable substance such as sugar or compound thereof with cream, syrup or flavoring matter, produced in a fluid or plastic form and introduced into the tube at the place and time of its formation, which formation is according to the disclosure of my aforesaid application.

In view of the foregoing, it is among the objects of my invention to provide a simple, economical apparatus by means of which hollow chocolate forms may be produced as a covering, sheathing, container or holder for various forms and kinds of confections, the latter being driven, forced or injected into the form simultaneously with the formation of the latter. It is also an object of my invention to produce indefinitely and by pressure a hollow cylinder of chocolate while the substance of the latter is at a temperature below its melting point, and to simultaneously fill said cylinder with any desired kind of sweetened substance, thus producing a confection of desirable quality with facility and rapidity.

In order that my invention may be clearly understood, I have provided drawings wherein:

Figure 2 is an enlarged view showing part of my apparatus in section substantially on the line 2—2 of Figure 1;

Figure 3 is a view of the structure shown in Figure 2 in end elevation;

Figure 4 is a view, slightly reduced in scale, showing the separator and core in top plan;

Figure 5 is an enlarged, central, sectional view of the core and mold of my apparatus, the view also illustrating the mode of treatment of the substances to produce a confection according to my invention;

Figure 6 is a rear end view of the separator and core of my apparatus shown in Figure 1, the view being on a scale larger than that of Figure 1; and Figure 7 is a perspective view of a section of the product taken substantially on the line 7—7, Figure 5.

Figure 1:
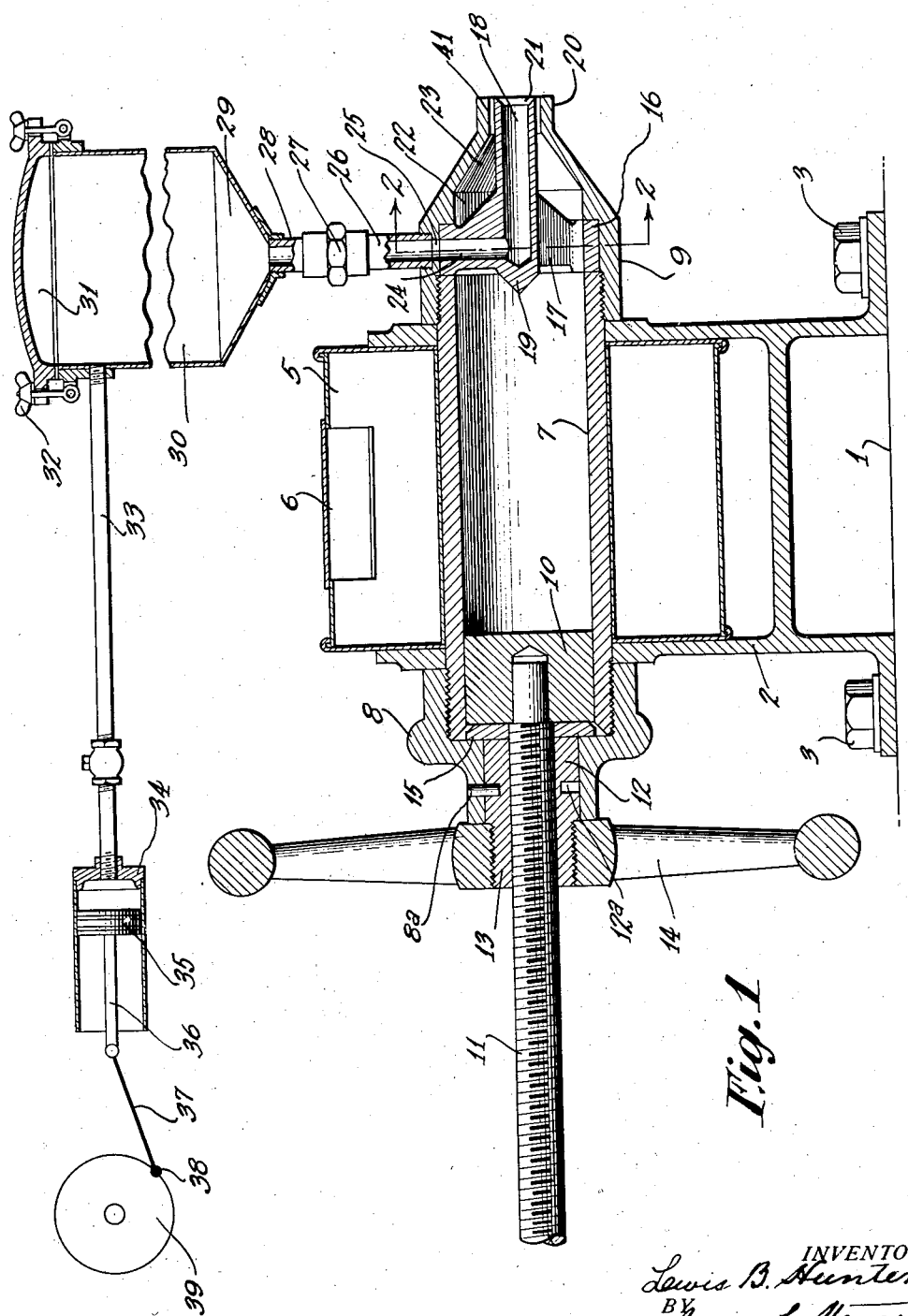
Figure 1 is a view showing my apparatus in longitudinal, vertical, central section, a few of the parts being shown in elevation.

Referring to the drawings, the numeral 1 indicates linearly the base affording a platform or support for the apparatus. This base has erected thereon a frame 2 which may be bolted in place, as at 3, the frame being in the form of a yoke adapted to receive between its branches a receptacle 5 having an opening at the top covered by a lid 6, through which opening the receptacle may be filled with cracked ice. Passing through both the branches of the frame and also through the receptacle 5 is a cylindrical container or holder 7 adapted to receive the chocolate or substance in any form, the said holder being held in place by the screw-cap and bearing 8 and the mold 9, the cap and mold being screwed upon opposite ends of the holder 7 until they abut against the outside of the opposite branches of the frame 2. A piston 10 operates within the holder 7, and its rod 11 is screw-threaded and extends through the nipple 12 operating in the bearing of the cap 8, said nipple having a reduced, screw-threaded end 13 upon which the handle 14 is mounted. The bearing of the screw-cap 8 has a pin 8ᵃ which operates in a groove 12ᵃ of the nipple 12, so that as the handle 14 is rotated the nipple may be rotated without longitudinal movement to drive the screw 11 and piston 10 lengthwise. A gasket or washer 15 aids in sealing the outer end of the holder. At one end of the holder 7 and within the mold 9 a separator 16 is held between the end of the holder and a shoulder of the mold 9, said separator being in the form of a ring provided with a plurality of arms 17, see Figures 1, 2 and 6, which support centrally within the ring and centrally of the holder and of the mold a tubular, cylindrical core 18. This core, at its inner end within the holder, is given the form of a cone 19, or it may be given a form corresponding to the passages through the ring 16 between the arms 17. The tubular core 18 is terminated abruptly at the outer end or nozzle 20 of the mold 9, see Figures 1 and 5, and said outer end of the core is preferably flared or beveled internally, as at 21. As shown in Figures 1 and 5, the mold 9 consists of the cylindrical portion 22 corresponding with the inner surface of the walls of the passage between the arms 17 of the separating ring 16, said cylindrical portion merging into the conical portion 23, the lesser diameter of which merges into the cylindrical passage of the nozzle 20. The portions 20, 22 and 23 of the mold surround the tubular core 18, the passage through which latter communicates with a passage 24 extending at a right-angle through one of the arms 17 of the ring 16, to the circumference of the latter, where it coincides with a passage 25 through the mold 9, which passage 25 is enlarged to receive the tubular pipe 26, which is threaded into the said enlargement, and which pipe is jointed by an adjustable coupling 27 with a pipe 28 threaded into the conical bottom 29 of the cylindrical container 30 adapted to receive the plastic or limpid substance with which the chocolate cylinder is filled. The container is provided with any suitable form of closure 31 so constructed that it may be removed and provided with bolts and winged nuts 32 for securing it in place. The container 30 is tapped at any suitable point in its circumference adjacent the top thereof and provided with a compressed air pipe 33, which is extended to and tapped into the end of a cylinder 34, in which works a piston 35, the rod 36 of which is connected by a pitman 37 coupled to the crank 38 of a driving means 39, it being understood that the compressed air cylinder 34 and the mechanism shown for actuating the piston thereof are only suggestive of a means for forcing compressed air into the top of the container 30 and are not to be taken as a limitation of my invention in this connection. Any suitable source of compressed air may be employed in order to create sufficient pressure within the container 30 above the confection, of whatever nature it may be, to force the latter downwardly through the conduits 28 and 26 through the tubular core 18, and into the chocolate cylinder, while the latter is being wrought into shape.

Viewing Figures 2 to 6, inclusive, it will be seen that the arms 17 of the separator are acutely oval in cross-section, this being for the purpose of allowing free passage of the chocolate substance past the same and through the openings 40 between said arms, the shape given said arms 17 facilitating the passage of the chocolate substance and presenting little or no resistance to such passage. The arm of the separator through which the passage 24 is formed is slightly larger than the other arms, this being merely to accommodate the passage, which may be of any diameter desired. As shown in Figures 1, 3 and 5, the circumferential space 41 between the core 18 and the interior surface of the nozzle 20 is comparatively narrow, and this narrow passage predetermines the thickness of the shell of the chocolate cylinder; and the nozzle which is extended as shown helps to form and maintain the form of the cylinder as the chocolate substance is pressed therethrough and around the core 18. The end 21 of the core, which is beveled or flared as shown in Figures 1 and 5, enables the compressed substance forced from the container 30 to slightly expand into the chocolate cylinder. While the space 41 is shown comparatively narrow, its size can be regulated or controlled by a nozzle 20 of different internal diameter, or by a core 18 of different diameter, it being understood that a mold of different size or a separator of different size can be substituted for the ones shown; and such mold and separator may also be given a different form in cross-section and at the delivery end.

The limpid or plastic condition of the substance used as a filler for the chocolate cylinder obviates the necessity for a high degree of pressure upon the top of the mass in the container 30, the pressure of the air within the receptacle being required to be sufficient only to keep the mass in motion, which latter is aided by gravity, during the passage of the mass through the conduit and the hollow core 18.

As shown in Figure 5, the chocolate cylinder 42 with its filling 43 may be fed from the apparatus indefinitely, and in order to receive the filled cylinder and temporarily support the same and cut the product into a desired length as a preliminary to wrapping, I may couple with the apparatus shown in the drawings a mechanism for receiving, holding and cutting the product such as is shown in my aforesaid application; but, this entire mechanism may be eliminated and a mere table or support 42 arranged adjacent the delivery end of the mold to receive and sustain temporarily the filled cylinder or product. While on said support the product may be chopped or cut into definite lengths, such as shown in Figure 7, and subsequently wrapped. The container 30 may be filled with any suitable confection substance, as heretofore noted, and the holder 7 may be filled (by opening the closure means at one end thereof) with chocolate in granular, shaved or other form, and the receptacle 5 may be filled with ice through the door 6, this maintaining the chocolate in the holder 7 at a low temperature, or at a temperature below its melting point. The pumping apparatus may then be set in operation to cause compressed air to impose pressure upon the top of the mass in the container 30, and simultaneously the piston 10 may be forced by the screw-rod 11 lengthwise of the holder 7 to compress the contents thereof and force it into the mold-end of the apparatus. This will cause the chocolate mass to form into a cylinder in the nozzle 20 of the mold around the hollow core 18, which mass will be forced from the mold at the delivery end upon the support 42. Simultaneously therewith the filling material will flow from the delivery end of the core into the chocolate cylinder filling the same substantially as shown in Figure 5, and producing the product shown in Figure 7. As before stated, the product may be formed in indefinite lengths or it may be cut or chopped by suitable means into definite lengths.

In the operation of the machine it is intended that the rate of delivery of the chocolate tube, and the rate at which the filler therefor is supplied to said tube shall coordinate. In starting the machine it is recommended that, as the chocolate tube emerges, a cork or closure means be introduced therein against which the filling material may impinge causing the same to expand and fill the tube as indicated in Figure 5.

It is within the scope of my invention to consider the chocolate holder as comprising the cylinder 7 and mold 9, and the hollow core 18 as being mounted and centered therein; and I do not wish my invention limited by the specific construction shown in the drawings, wherein the conduit from the container 30 through the core is shown as passing through the holder or its supported parts at a right-angle to the longitudinal axis of said holder, since said conduit may pass through the holder at any desired angle and from any desired point thereof.

Having thus described my invention, what I claim and desire to secure by Letters Patent is:

In an apparatus of the character described, a core forming nozzle, a supply chamber communicating with said nozzle and adapted to contain core forming material, a tubular envelope forming opening surrounding the core forming nozzle, a compression cylinder communicating with said opening and adapted to contain chocolate in solid state, means for applying sufficient pressure to the chocolate to force it through said tubular forming opening to form the chocolate into a tubular envelope, means for refrigerating the chocolate while in the compression cylinder sufficiently to preclude the heat of compression from reducing the chocolate to a plastic state while passing through the tubular opening, and means for exuding the core forming material through the core forming nozzle into the chocolate tube thus produced and during the formation thereof.

Signed by me at New York this 4th day of December, 1923.

LEWIS B. HUNTER.